(12) United States Patent
Schmid

(10) Patent No.: US 12,370,926 B2
(45) Date of Patent: Jul. 29, 2025

(54) DEVICE AND METHOD FOR THE MAINTENANCE OF AN OVERHEAD LINE SYSTEM OF A TRACK

(71) Applicant: ROBEL Bahnbaumaschinen GmbH, Freilassing (DE)

(72) Inventor: Gregor Schmid, Ainring (DE)

(73) Assignee: ROBEL Bahnbaumaschinen GmbH, Freilassing (DE)

( * ) Notice: Subject to any disclaimer, the term of this patent is extended or adjusted under 35 U.S.C. 154(b) by 856 days.

(21) Appl. No.: 17/509,251

(22) Filed: Oct. 25, 2021

(65) Prior Publication Data

US 2022/0041190 A1    Feb. 10, 2022

Related U.S. Application Data

(63) Continuation of application No. PCT/EP2020/055114, filed on Feb. 27, 2020.

(30) Foreign Application Priority Data

Apr. 23, 2019  (DE) .......................... 102019205765.9

(51) Int. Cl.
*B60M 1/28*    (2006.01)
*B25J 5/06*    (2006.01)
(Continued)

(52) U.S. Cl.
CPC .................. *B60M 1/28* (2013.01); *B25J 5/06* (2013.01); *B25J 9/0009* (2013.01);
(Continued)

(58) Field of Classification Search
CPC .......... B60M 1/28; B61D 15/00; B61D 15/02; B61D 15/08; B61D 15/125; B25J 5/06; B25J 5/007; B25J 9/0009; B25J 11/00; B25J 19/0075; B25J 19/021; B25J 19/023; B25J 19/027; B25J 5/02; B61C 13/00; H02G 1/00; H02G 1/02; B66C 23/50; E01B 26/00; E01B 29/00; B61K 13/00
(Continued)

(56) References Cited

U.S. PATENT DOCUMENTS

| | | | |
|---|---|---|---|
| 5,048,797 A * | 9/1991 | Theurer ................... | B60M 1/28 254/134.3 R |
| 5,114,119 A | 5/1992 | Theurer et al. | |
| 2015/0041739 A1 | 2/2015 | Claypool | |

FOREIGN PATENT DOCUMENTS

| | | |
|---|---|---|
| AT | 402184 B | 2/1997 |
| CN | 108673467 A | 10/2018 |

(Continued)

*Primary Examiner* — Zachary L Kuhfuss
*Assistant Examiner* — Heaven R Buffington
(74) *Attorney, Agent, or Firm* — Laurence A. Greenberg; Werner H. Stemer; Ralph E. Locher

(57) ABSTRACT

A device for the maintenance of an overhead line system of a track has a handling device and a displacement device. The displacement device serves to displace the handling device between a transport position and a working position. In the working position, the handling device reaches the overhead line system and is able to perform maintenance work by way of a tool. At least one sensor serves for controlling and/or monitoring the handling device. The device thus enables a simple, efficient and safe maintenance of the overhead line system.

18 Claims, 4 Drawing Sheets

(51) Int. Cl.
  *B25J 9/00* (2006.01)
  *B25J 19/00* (2006.01)
  *B25J 19/02* (2006.01)
  *B61D 15/00* (2006.01)
  *B61D 15/08* (2006.01)

(52) U.S. Cl.
  CPC ......... *B25J 19/0075* (2013.01); *B25J 19/023* (2013.01); *B61D 15/00* (2013.01); *B61D 15/08* (2013.01)

(58) Field of Classification Search
  USPC ........ 191/33 R, 44.1, 34, 35, 36, 37, 38, 39, 191/40, 41, 42, 43; 104/307
  See application file for complete search history.

(56) References Cited

FOREIGN PATENT DOCUMENTS

| | | | |
|---|---|---|---|
| EP | 0416136 A1 | 3/1991 | |
| JP | H06144220 A | 5/1994 | |
| WO | WO-2019233483 A1 * | 12/2019 | .............. B25J 19/00 |

* cited by examiner

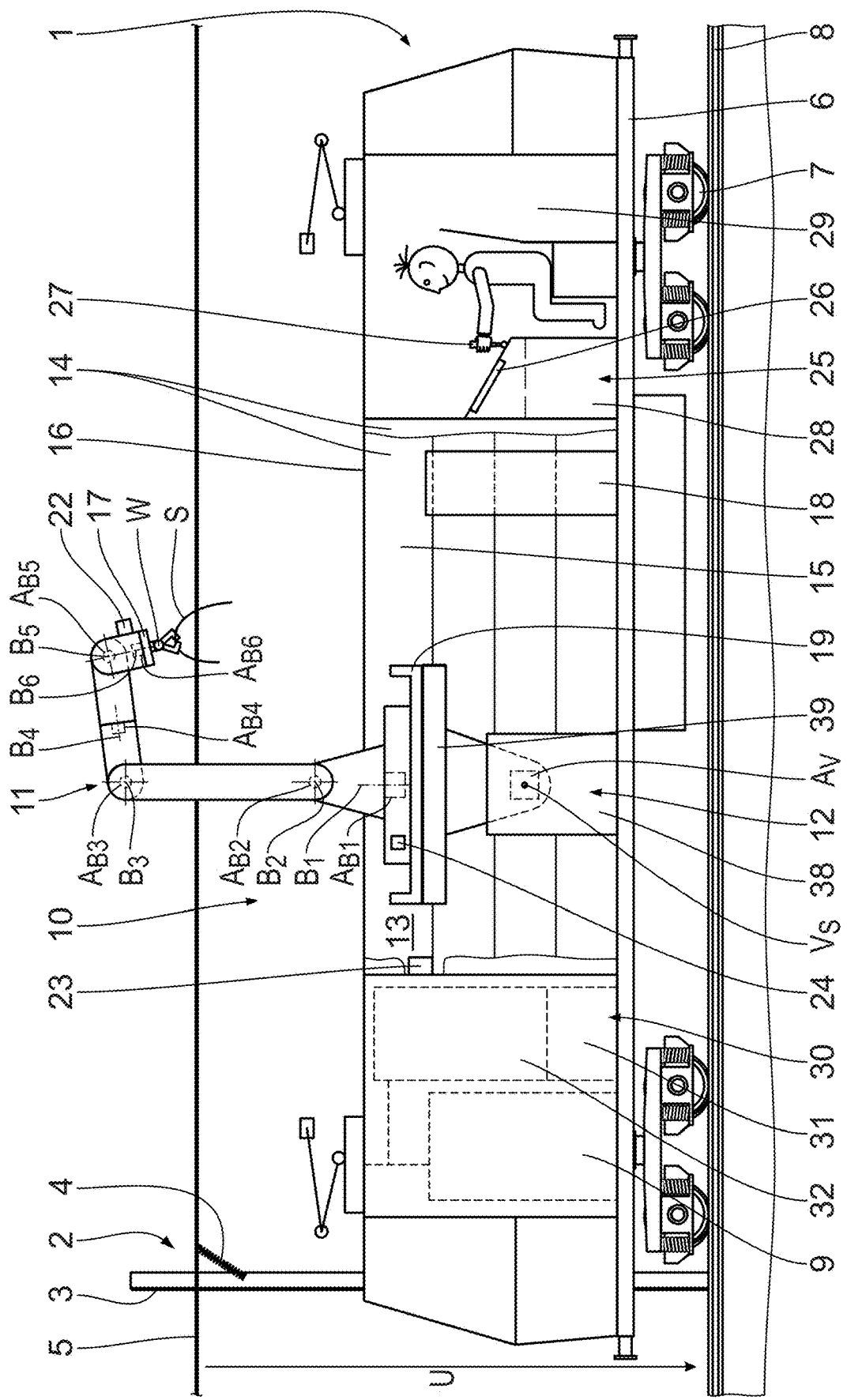

DEVICE AND METHOD FOR THE MAINTENANCE OF AN OVERHEAD LINE SYSTEM OF A TRACK

CROSS-REFERENCE TO RELATED APPLICATION

This application is a continuation, under 35 U.S.C. § 120, of copending international patent application PCT/EP2020/055114, filed Feb. 27, 2020, which designated the United States; this application also claims the priority, under 35 U.S.C. § 119, of German patent application DE 10 2019 205 765.9, filed Apr. 23, 2019; the prior applications are herewith incorporated by reference in their entirety.

FIELD AND BACKGROUND OF THE INVENTION

The invention relates to a device and a method for the maintenance of an overhead line system of a track.

In rail operations, malfunctions regularly occur on overhead line systems of tracks. Typical causes of malfunctions are, for example, defective insulators or unwanted interference objects, such as branches, which are located on an overhead line. In order to maintain a disturbed overhead line system, the overhead line is de-energized so that the disturbance can be removed manually by a worker. On the one hand, this leads to an impairment or interruption of rail operations, since the overhead line has to be completely de-energized in sections. On the other hand, faults may occur during de-energization, which is posing a risk to the worker's life.

From AT 402 184 B, a machine for maintaining an overhead line is known, which comprises a lifting platform and a shifting device arranged thereon. The shifting device has a swivelable and telescopic crane arm, at the end of which a shifting element is arranged.

SUMMARY OF THE INVENTION

The invention is based on an object of creating a device which enables a simple, efficient and safe maintenance of an overhead line system of a track.

This object may be achieved by a device for the maintenance of an overhead line system of a track with a handling device for handling a tool, and a displacement device for displacing the handling device between a transport position and a working position, comprising at least one sensor for controlling and/or monitoring the handling device. According to the invention, the handling device serves for automated handling of a tool. The handling device can be operated in a partially automated or fully automated manner. The handling device is arranged on a displacement device. The displacement device serves for displacing the handling device between a transport position and a working position. In the transport position, the overhead line system is out of reach of the handling device, whereas in the working position the overhead line system is within reach of the handling device. The displacement device can preferably be actuated by means of a drive.

In the transport position of the handling device, the device has a compact transport state so that the device may be transported easily, efficiently and safely to a place of use. For this purpose, the device is arranged, for example, on a vehicle, in particular a rail vehicle, a road vehicle or an off-road vehicle, or on a rail car or a trailer or semitrailer. At the place of use, the handling device is transferred from the transport position to the working position by means of the displacement device. In the working position, the overhead line system to be maintained is within reach of the handling device. By means of the handling device and a tool arranged on the handling device, maintenance work required in the working position may be performed automatically. The tool, for example, is designed as a gripper. The maintenance work may be carried out in a fully automated manner by means of at least one sensor and a control unit, for example, and/or in a partially automated manner by means of a remote control device which is actuated by a worker at a safe distance. After the completion of the maintenance work, the handling device is transferred back into the transport position by means of the displacement device and transported away from the place of use in a compact transport state. The device thus enables simple, efficient and safe maintenance of overhead line systems.

The at least one sensor is arranged in particular at the handling device and/or at the displacement device. Preferably, the at least one sensor is designed as an optical sensor. The at least one sensor is, for example, a radar sensor and/or a laser scanner and/or a camera. In particular, the at least one sensor serves for detecting the object to be processed and/or to detect the object to be removed. The at least one sensor serves in particular for detecting a receiving space for the displacement device and/or for the handling device and/or a working space of the displacement device and/or of the handling device. Detecting the receiving space and/or the working space enables sensing persons located in the receiving space and/or the working space. When persons are detected in the receiving space and/or the working space, the displacement device and/or the handling device is stopped automatically, for example. Furthermore, the at least one sensor serves in particular for controlling or positioning the handling device. Preferably, the at least one sensor is designed for measuring an overhead line voltage. This enables the device to check whether or not a voltage disconnection of the overhead line has taken place. In particular, the at least one sensor is electromagnetically or electrically decoupled, for example by means of an optocoupler. The at least one sensor serves for the automated, for example fully automated or partially automated, performance of maintenance work. For fully automated execution of maintenance work, the object to be processed or removed is detected by means of the at least one sensor and the handling device is controlled, or regulated, positioned and monitored fully automatically by means of the at least one sensor and a control unit. During the semi-automated execution of maintenance work, a remote control is formed by means of the at least one sensor and a control unit. By means of the remote control, a worker operates the device, in particular the displacement device and/or the handling device and/or the tool, by means of the at least one sensor and a screen. In this case, the worker is located at a safe distance from the overhead line system, for example in a cabin. The cabin is designed in particular to be electromagnetically shielded.

Preferably, the device, in particular the handling device and/or the displacement device, is configured as to be electrically insulating. This means that it is not necessary to disconnect the overhead line from the power supply in order to carry out maintenance work. Accordingly, rail operation is not impaired. Since a worker is not in the vicinity of the overhead line at any time, and in particular is not in contact with the overhead line or any object which may be under voltage at any time, there is no danger whatsoever.

The device preferably comprises an enclosure. The enclosure is designed in particular as a container, for example as a standard container or ISO container. In the transport position, the handling device and in particular also the displacement device are arranged inside the enclosure, so that the device appears as an enclosure and has the dimensions of the enclosure. The device can thus be easily and safely transported to the place of use. During transport, the handling device is protected from environmental influences inside the enclosure. At the place of use, the handling device is transferred from the transport position to the working position outside the enclosure by means of the displacement device. In the working position, the maintenance work can then be carried out in the manner described above. The displacement device is preferably fastened to the enclosure, in particular in an interior space of the enclosure. In the transport position, the displacement device is preferably arranged inside the enclosure, whereas in the working position, the displacement device is arranged partly inside and partly outside the enclosure. The enclosure has at least one enclosure opening for displacing the handling device between the transport position and the working position. The at least one enclosure opening may be opened or closed as required and/or be permanently open, for example by means of an associated protective element. Preferably, the enclosure has two opposing long sides, two opposing short sides, an underside and an opposing upper side. Preferably, the at least one enclosure opening is formed on a short side and/or on a long side and/or on the upper side of the enclosure. Preferably, the enclosure can be reversibly fastened to a chassis by means of fastening elements.

A device in which the displacement device forms at least one displacement axis for displacing the handling device in a vertical direction, ensures a simple, efficient and safe maintenance of the overhead line system. The at least one displacement axis is designed in particular as at least one linear axis and/or as at least one swivel axis. The at least one displacement axis serves for displacing the handling device in a vertical direction. The vertical direction is in particular parallel to the direction of gravity. In particular, the vertical direction is oriented substantially perpendicularly to a chassis to which the device is fastened. By means of the at least one displacement axis, it is possible to displace the handling device between the transport position and a working position, which is located higher relative to the transport position.

A device in which the displacement device forms at least one linear axis for linearly displacing the handling device, ensures a simple, efficient and safe maintenance of the overhead line system. By means of the at least one linear axis, the handling device may be displaced in a simple manner between the transport position and the working position. Preferably, the at least one linear axis extends in a vertical direction and/or in a horizontal direction. Preferably, the linear axis runs substantially parallel to the direction of gravity. In particular, the displacement device has a mounting element to which the handling device is fastened. The displacement device is designed, for example, as a lifting platform. In particular, the lifting platform comprises a platform and a scissor kinematics forming the linear axis. The platform serves for mounting the handling device. The displacement device is designed, for example, as a slide unit. The slide unit comprises a slide and a linear guide. The linear guide forms the linear axis. The slide serves as a mounting element for mounting the handling device. The slide is guided on the linear guide. The displacement device can be actuated in particular by means of a drive.

A device in which the displacement device forms at least one swivel axis for swiveling the handling device, ensures a simple, efficient and safe maintenance of the overhead line system. The at least one swivel axis preferably runs parallel to a horizontal direction. For forming the at least one swivel axis, the displacement device has in particular a swivel bridge to which the handling device is fastened. The swivel bridge serves as a mounting element for mounting the handling device. The displacement device can be actuated in particular by means of a drive.

A device in which the handling device comprises at least three, in particular at least four, and in particular at least five movement axes, ensures a simple, efficient and safe maintenance of the overhead line system. The movement axes are designed in particular as swivel axes. Preferably, the handling device comprises at least one vertical swivel axis, at least one horizontal swivel axis and/or at least one freely orientable swivel axis. At least one of the swivel axes is preferably swivelable by at least 360°, i.e. designed as a rotary axis. The handling device is designed in particular as a multi-axis robot, for example as an industrial robot. The multi-axis robot is fastened to the displacement device. In the working position, the multi-axis robot is aligned in particular in a vertical direction, so that the multi-axis robot reaches the overhead line system in a simple manner. Preferably, the handling device has at least three and/or at most six movement axes.

A device comprising at least one electrically insulating insulation element to prevent an undesired current flow due to an overhead line voltage, ensures a simple, efficient and safe maintenance of the overhead line system. Due to the at least one electrically insulating insulation element, maintenance work may be carried out when the overhead line voltage is present. Thus, a voltage disconnection of the overhead line is not necessary. The at least one insulating element is in particular part of a tool and/or part of the handling device and/or part of the displacement device. Preferably, the at least one insulation element is designed in such a way that electric insulation is provided between a tool and the handling device and/or between the handling device and the displacement device and/or between the displacement device and a chassis.

A device in which the handling device and/or the displacement device comprises at least one electric drive, ensures a simple, efficient and safe maintenance of the overhead line system. Due to the fact that individual movement axes or all movement axes of the handling device and/or individual displacement axes or all displacement axes of the displacement device can be actuated by means of a respective electric drive, the device can be controlled in a simple manner. The at least one electric drive and/or at least one sensor and/or a control unit may be designed as to be electromagnetically shielded and/or electromagnetically decoupled. As a result, possible interference and/or possible damage due to electromagnetic radiation and/or an undesirable current flow may be avoided. If, for example, an electrically actuatable handling device is used, the design of the electrics and/or electronics is such that the overhead line may be touched when switched on without the device being damaged or disturbed due to the overhead line voltage. The control unit and/or required sensors are designed separately from the handling device and/or from the displacement device, for example, by means of optocouplers. Electric drives and/or actuators are protected, for example, by means of a Faraday cage and/or a Faraday structure of the handling device and/or the displacement device. The handling device and/or the displacement device may be actuatable directly by means of at least one electric drive and/or indirectly by means of at least one electrically insulating transmission mechanism by means of at least one electric drive. The electrically insulating transmission mechanism is, for example, a cable pull mechanism.

A device in which the handling device and/or the displacement device comprises at least one fluid-operated drive, ensures a simple, efficient and safe maintenance of the overhead line system. Due to the fact that the handling device and/or the displacement device is designed to be fluid-operated, in particular exclusively fluid-operated, means that the device is not disturbed and/or damaged by electromagnetic radiation and/or an undesirable current flow due to the overhead line voltage. The handling device and/or the displacement device can be operated or actuated, for example, pneumatically and/or hydraulically. The at least one fluid-operated drive is designed, for example, as a single-acting and/or double-acting piston-cylinder unit and/or as a fluid motor, in particular as a hydraulic motor and/or pneumatic motor. For providing a pressure fluid, the device comprises a pressure fluid supply unit. The pressure fluid supply unit comprises a pressure fluid generator and/or a pressure fluid accumulator. The pressure fluid generator is designed in particular as a pump. Preferably, the pressure fluid generator can be operated electrically. Preferably, the device comprises a pneumatic pressure fluid supply unit and/or a hydraulic pressure fluid supply unit. Pressure fluid lines and/or pressure fluid connections are preferably designed as to be electrically insulating. The handling device and/or the displacement device may thus be operated without current. The pressure fluid supply unit, in particular a pressure fluid generator and/or pressure fluid valves, may be electrically actuatable.

A device in which the handling device comprises a tool holder in which a tool is accommodated, ensures a simple, efficient and safe maintenance of the overhead line system. The tool is preferably designed as a gripper or as a combined separating-gripping tool. The gripper can be actuated, for example, electrically, pneumatically and/or hydraulically. The tool holder and/or the tool are preferably designed as to be electrically insulating. The gripper may comprise an electrically insulating transmission mechanism. The separating-gripping tool may be used to cut through and grip the interfering objects to be removed.

A device comprising a tool magazine for providing tools, ensures a simple, efficient and safe maintenance of the overhead line system. Due to the tool magazine, the handling device is provided with suitable tools for performing various maintenance tasks. The device thereby enables an automatic tool change. The automatic tool change may be performed in such a way that the handling device automatically places a tool that is no longer required in the tool magazine and/or automatically picks up a required tool from the tool magazine. If required, a tool changer may be provided in addition to the tool magazine. In this case, the tool changer transfers a tool that is no longer needed from the handling device to the tool magazine and deposits it in the tool magazine. Accordingly, the tool changer removes a required tool from the tool magazine and transfers it to the handling device. The tools accommodated in the tool magazine are preferably designed to be electrically insulating.

A device comprising an energy generator and/or an energy storage, ensures a simple, efficient and safe maintenance of the overhead line system. Due to the fact that the device comprises an energy generator and/or an energy storage, the device can be operated largely autonomously. The device can thus be operated independently of an external energy supply. The energy generator and/or the energy storage serves in particular for providing electric energy. Preferably, the energy generator comprises a power unit with a drive operable by means of a fuel and a power generator driven thereby. The fuel-operable drive may, for example, be a diesel drive of a rail vehicle. The energy storage is designed in particular as an accumulator. Alternatively or additionally, the device may have a connection for connecting to an external electric power supply.

A device comprising a control unit for controlling and/or monitoring the handling device, ensures a simple, efficient and safe maintenance of the overhead line system. The control unit is preferably electromagnetically or electrically decoupled, for example by means of at least one optocoupler. The control unit serves for automated, for example fully automated or partially automated, performance of maintenance work. The control unit is in particular in signal communication with at least one sensor for controlling and/or monitoring the handling device.

A device comprising at least one protective element for protecting the handling device in the transport position, ensures a simple, efficient and safe maintenance of the overhead line system. The at least one protective element serves to protect the handling device and the displacement device from environmental influences during transport. The protective element is displaceable relative to the handling device and/or to the displacement device. The at least one protective element is actuatable, in particular, by means of a drive. Preferably, the at least one protective element is configured as a displaceable roof which is closed in a transport state and open in a working state. The at least one protective element is designed, for example, as a roller shutter and/or as a sectional cover.

The invention is further based on an object of creating a mobile maintenance system which enables a simple, efficient and safe maintenance of an overhead line system of a track.

This object may be achieved by a mobile maintenance system for the maintenance of an overhead line system of a track comprising a chassis, a plurality of wheels rotatably mounted on the chassis, and a device, which is arranged on the chassis. Due to the fact that the device is arranged on a chassis, the device can be transported easily, efficiently and safely to and from a place of use. The device may be fastened in a fixed or reversible manner to the chassis. For example, the mobile maintenance system is designed as a rail vehicle, a road vehicle, an off-road vehicle, a rail car or a trailer. Preferably, the mobile maintenance system has its own traction drive. Alternatively, the mobile maintenance system may not have its own traction drive, but may be designed as a rail car or trailer and transported to and from the place of use by means of a vehicle. If the mobile maintenance system is designed as a rail vehicle or rail car, the device has a compact transport state such that the clearance gauge is not violated and the device can be transported easily, efficiently and safely to the place of use.

The invention is further based on an object of creating a method which enables a simple, efficient and safe maintenance of an overhead line system of a track.

This object may be achieved by a method for the maintenance an overhead line system of a track comprising the steps of: providing a device according to the embodiments of the invention, transporting the device to a place of use, wherein the handling device is in the transport position, transferring the handling device from the transport position to the working position by means of the displacement device, and performing maintenance work by means of the handling device and a tool. The advantages of the method according to the invention correspond to the advantages of the device according to the invention already described. The method according to the invention may in particular also be further developed by providing a mobile maintenance system for the maintenance of an overhead line system of a track comprising a chassis, a plurality of wheels rotatably mounted on the chassis, and a device for the maintenance of an overhead line system of a track, which is arranged on the chassis. The maintenance work on the overhead line system may be carried out with the overhead line voltage applied or with the overhead line voltage disconnected. Preferably, the overhead line system or the overhead line is not de-energized to perform the maintenance work. The maintenance work is therefore preferably carried out when the overhead line voltage is present. After the maintenance work has been carried out, the handling device is moved from the working position back to the transport position and transported away from the place of use. Preferably, the maintenance work includes the removal of interference from the overhead line, in particular the removal of interfering objects.

Further features, advantages and details of the invention will be apparent from the following description of several embodiments.

BRIEF DESCRIPTION OF THE FIGURES

FIG. 4 shows a side view of a mobile maintenance system for the maintenance of an overhead line system of a track according to a third embodiment in a working state.

DETAILED DESCRIPTION OF THE INVENTION

Figure 1:
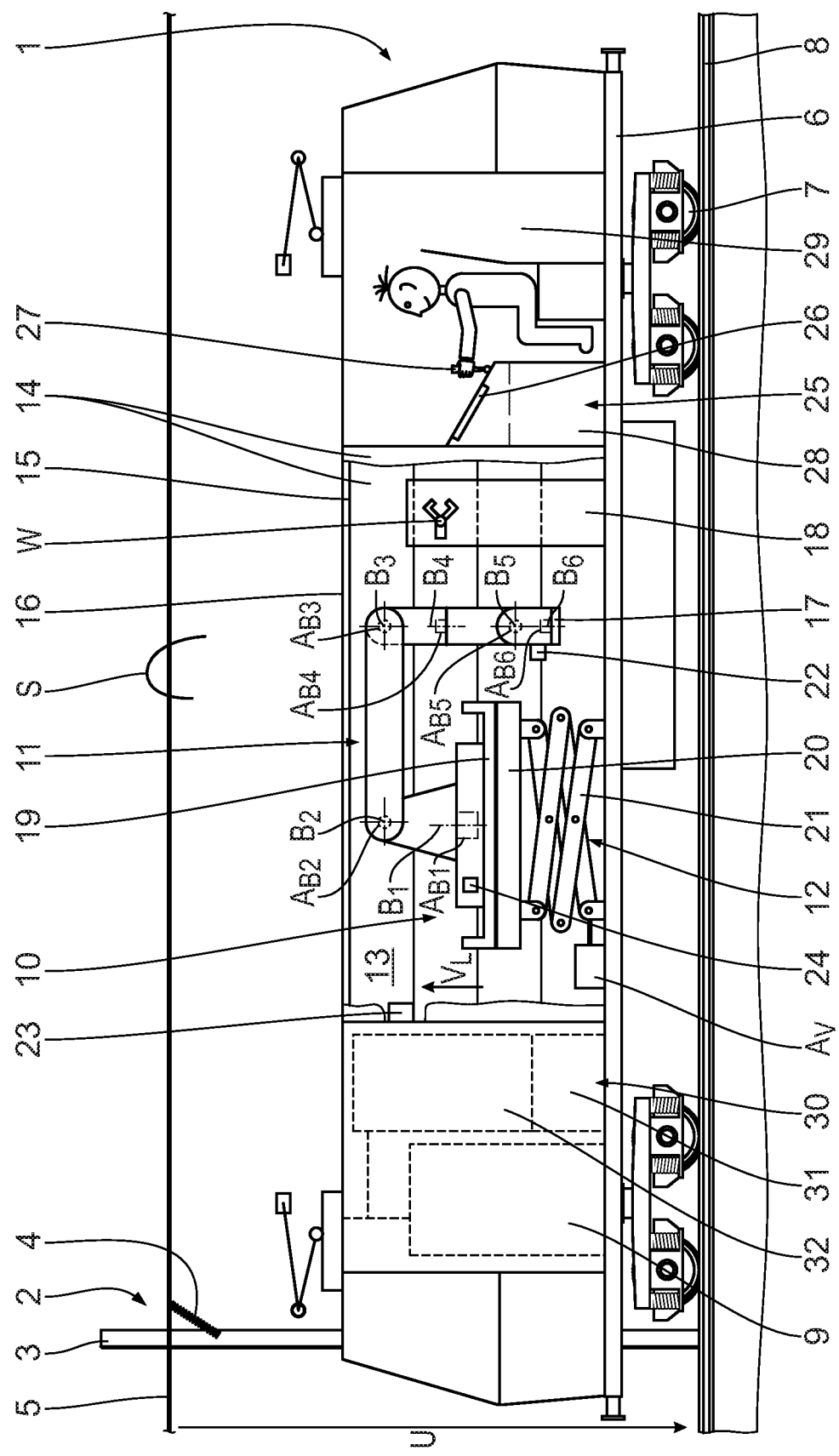
FIG. 1 shows a side view of a mobile maintenance system for maintaining an overhead line system of a track according to a first embodiment in a transport state.

A first embodiment of the invention is described below with reference to FIGS. 1 and 2. A mobile maintenance system 1 is designed as a rail vehicle. The maintenance system 1 serves to maintain an overhead line system 2 of a track. The overhead line system 2 comprises overhead line masts 3 to which an overhead line 5 is fastened by means of insulators 4. In a operating state, an overhead line voltage U is applied to the overhead line 5.

The maintenance system 1, which is designed as a rail vehicle, comprises a chassis 6 on which a number of axles with wheels 7 fastened to them are rotatably mounted. The wheels 7 are guided on rails 8 of the track. The maintenance system 1 has an electric traction drive 9 which is supplied with electric energy either from the overhead line 5 or from a power supply unit. The power supply unit is described in more detail below.

The maintenance system 1 has a device 10 for the maintenance of the overhead line system 2. The device 10 comprises a handling device 11 and a displacement device 12 for displacing the handling device 11 between a transport position and a working position. FIG. 1 illustrates the maintenance system 1 in a transport state, in which the handling device 11 and the displacement device 12 are in the transport position. In the transport state, the handling device 11 and the displacement device 12 are completely accommodated in a receiving space 13 of the maintenance system 1 or the rail vehicle. The receiving space 13 is bounded by the chassis 6, side walls 14 and a protective element 15.

The protective element 15 is arranged on an upper side of the receiving space 13 opposite the chassis 6. A maintenance opening 16 is formed on the upper side of the receiving space 13, which is closed by the protective element 15 in the transport state and is released and exposed by the protective element 15 in the working state. For this purpose, the protective element 15 can be displaced manually or by means of a drive not shown in more detail. The protective element 15 is designed, for example, as a sectional cover or roof which can be displaced along a side wall 14.

The handling device 11 is designed as a multi-axis robot. The handling device 11 is, for example, an industrial robot. The handling device 11 has six movement axes, which are designated $B_1$ to $B_6$ in detail. The movement axes $B_1$ to $B_5$ are designed as swivel axes. The movement axis $B_6$ is designed as a rotary axis. For receiving a tool W, the handling device 11 has a tool holder 17. The structure of the handling device 11 or of the multi-axis robot is known and usual.

The handling device 11 serves for handling a received tool W. For actuating the movement axes $B_1$ to $B_6$, the handling device 11 has associated electric drives $A_{B1}$ to $A_{B6}$. The electric drives $A_{B1}$ to $A_{B6}$ are generally designated $A_B$.

For providing tools W required for the maintenance, the device 10 comprises a tool magazine 18. The tool magazine 18 is arranged in the receiving space 13. If required, an additional tool changer may be provided.

The handling device 11 is connected to the displacement device 12 via an electrically insulating insulation element 19. By means of the insulating element 19, the handling device 11 is electrically insulated from the displacement device 12 and the chassis 6. An undesired current flow due to the overhead line voltage U is prevented by means of the insulation element 19.

The displacement device 12 is fastened to the chassis 6. The chassis 6 extends in an x-direction and a y-direction perpendicular to the x-direction. The displacement device 11 forms a displacement axis $V_L$. The displacement axis $V_L$ serves to displace the handling device 11 in a vertical z-direction. The z-direction is perpendicular to the x-direction and the y-direction. The x, y and z directions form a Cartesian coordinate system.

The displacement device 12 is designed as a lifting platform. The displacement device 12 comprises a platform 20 and a scissor kinematics 21. The handling device 11 is connected with the platform 20 via the insulation element 19. The scissor kinematics 21 is connected with the platform 20 and the chassis 6. The scissor kinematics 21 is actuatable by means of an electric drive $A_V$. The displacement axis $V_L$ is designed as a linear axis, so that the handling device 11 can be displaced linearly in the vertical z-direction. The z-direction runs essentially parallel to the direction of gravity. The handling device 11 can thus be displaced towards or away from the overhead line 5.

In order to carry out maintenance work, the device 10 has sensors 22, 23, 24 and a control unit 25. A first sensor 22 is designed as a camera. The first sensor 22 is arranged in the region of the tool holder 17 at the handling device 11. A second sensor 23 is designed as a camera and is arranged in the receiving space 13 on one of the side walls 14. A third sensor 24 is designed as a voltage measurement sensor and is arranged on the handling device 11. The third sensor 24 serves for measuring the overhead line voltage U.

The sensors 22, 23, 24 are in signal communication with the control unit 25. The control unit 25 serves to form a remote control. For this purpose, the control unit 25 has at least one screen 26 and operating elements 27 as well as a computer 28. The control unit 25 is arranged in a cabin 29.

For electric energy supply, the device 10 has an energy supply unit 30. The energy supply unit 30 comprises an energy generator 31 and an energy storage 32 for providing electric energy. The energy supply unit 30 is arranged on the chassis 6. The energy generator 31 comprises, for example, a power unit having a drive operable by means of a fuel and a power generator driven thereby. The energy storage 32 is designed, for example, as an accumulator. By means of the energy supply unit 30, the electric traction drive 9 may also be supplied with electric energy. The energy supply unit 30 may comprise rectifiers, inverters and/or converters not shown in greater detail.

In the following, the operating principle of the mobile maintenance system 1 is described:

FIG. 1 shows a disturbance object S located on the overhead line 5. The disturbance object S is, for example, a branch. The disturbance object S is to be removed by means of the mobile maintenance system 1.

First, the maintenance system 1 is in the transport state shown in FIG. 1. The handling device 11 and the displacement device 12 are arranged in the transport position shown in FIG. 1 in the receiving space 13. The protective element 15 closes the maintenance opening 16 so that the handling device 11 and the displacement device 12 are protected from environmental influences. In the transport state, the maintenance system 1 is driven to the place of use by means of the traction drive 9. Electric power is supplied, for example, up to the disturbance object S via the overhead line 5 and at the place of use via the power supply unit 30.

Figure 2:
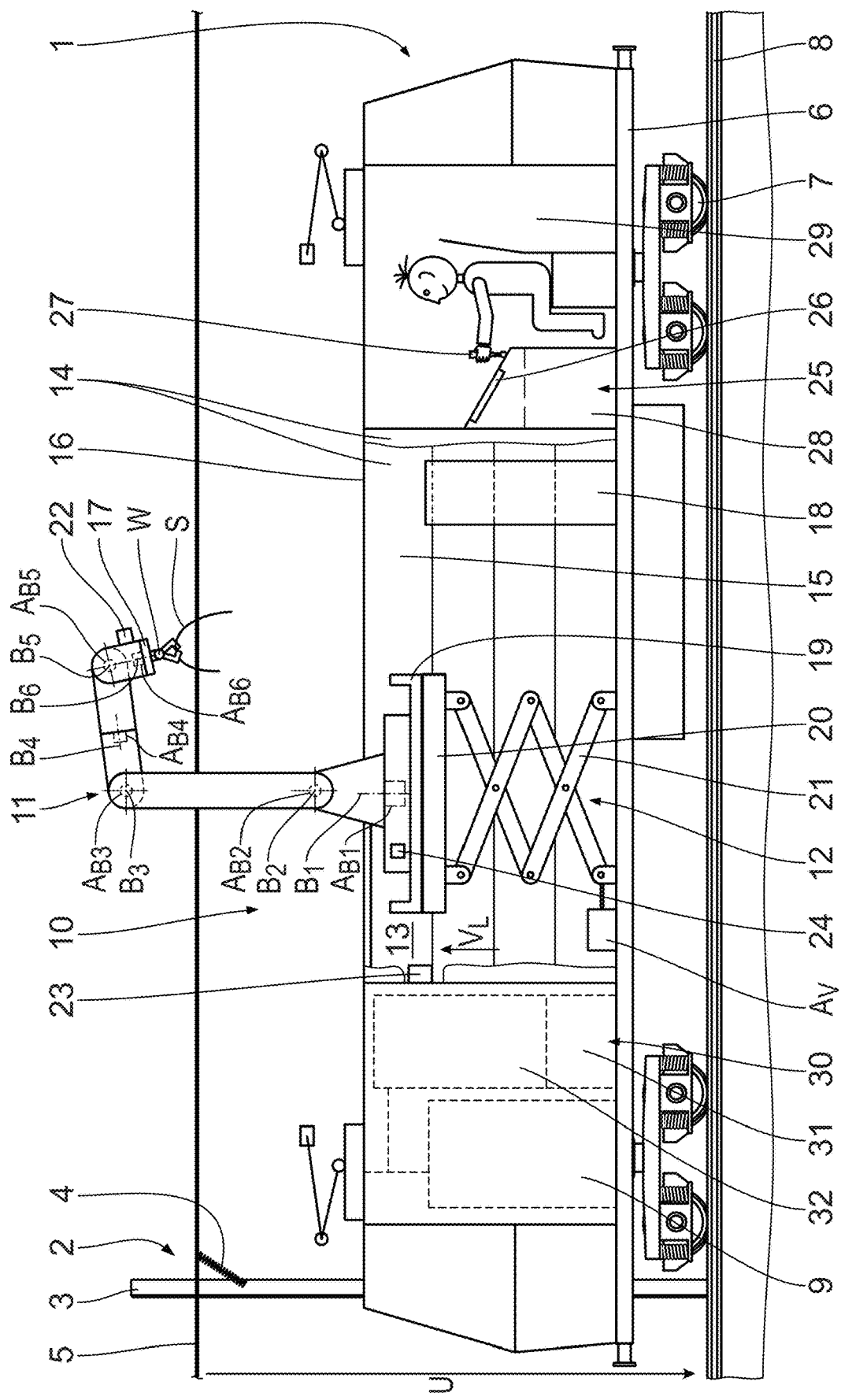
FIG. 2 shows a side view of the mobile maintenance system according to FIG. 1 in a working state.

At the place of use, the maintenance system 1 is transferred from the transport state to the working state shown in FIG. 2. For this purpose, the protective element 15 is first opened so that the maintenance opening 16 is open or exposed. Subsequently, the handling device 11 and the displacement device 12 are remotely controlled by a worker in the cabin 29. The sensors 22, 23 transmit captured images to the screen 26 so that the worker can remotely control the device 10 using the operating elements 27.

The handling device 11 first picks up a suitable tool W from the tool magazine 18. The tool W is, for example, a gripper. The tool W is designed in such a way that the gripper is opened or closed by a movement about the movement axis $B_6$.

The electric drive $A_V$ then actuates the displacement device 12 so that the handling device 11 is displaced linearly along the displacement axis $V_L$ in the z-direction towards the overhead line 5. The displacement device 12 is locked in the working position. The handling device 11 is now in the desired working position.

The tool W, which is designed as a gripper, and the handling device 11 can now be used to remove the disturbance object S from the overhead line 5. It is not necessary for the overhead line 5 to be de-energized. The overhead line voltage U can therefore be applied during the maintenance work. When a tool change is required, the handling device 11 places the tool W that is no longer required in the tool magazine 18 and removes a needed tool W from the tool magazine 18. The removed disturbance object S may then be placed in the receiving space 13 and transported away with it.

When the maintenance work is complete, the handling device 11 and the displacement device 12 are moved back to the transport position. The displacement device 12 is locked in the transport position. The protective element 15 is closed again. The handling device 11 deposits the tool W that is no longer required in the tool magazine 18. The mobile maintenance system 1 can now be moved to another place of use.

Figure 3:
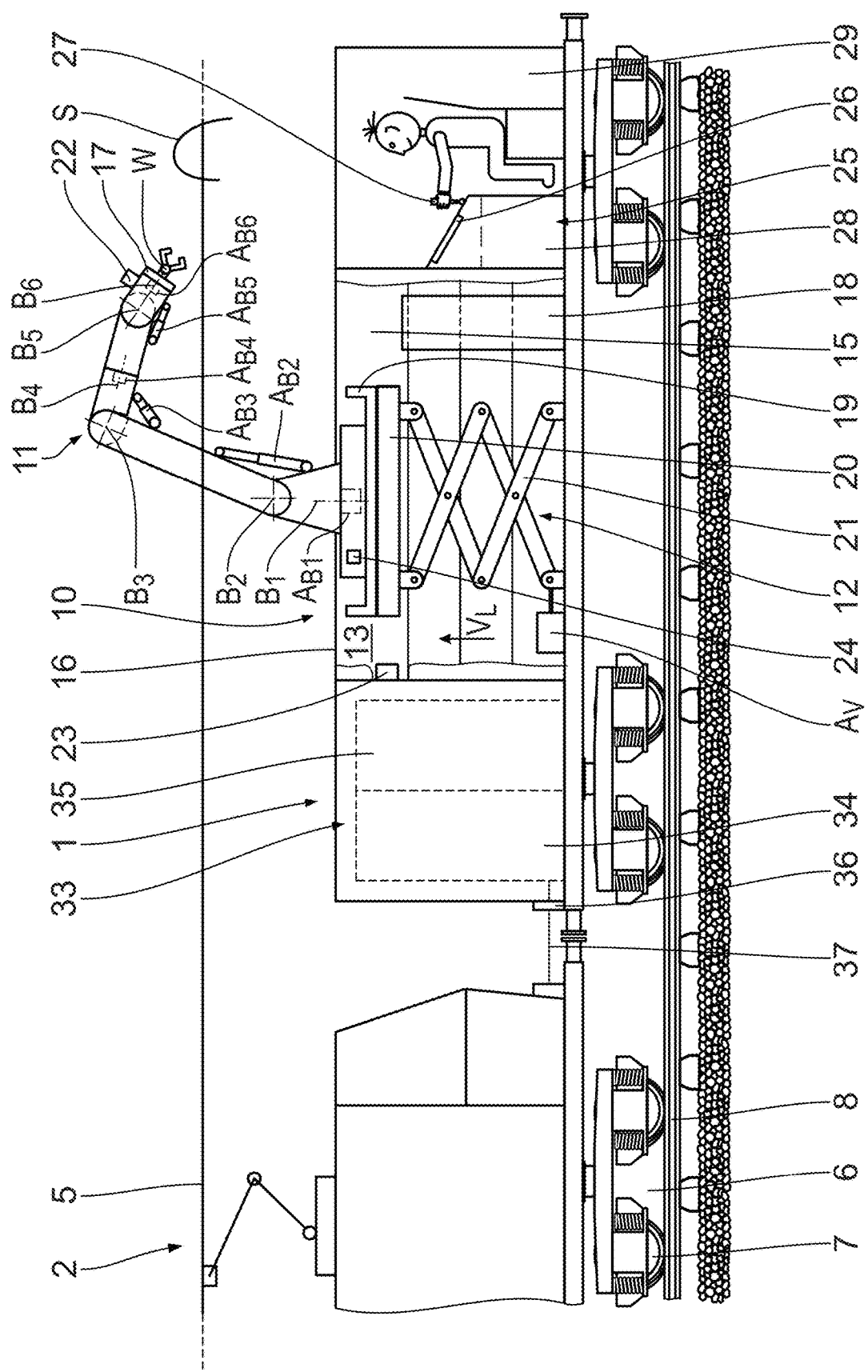
FIG. 3 shows a side view of a mobile maintenance system for the maintenance of an overhead line system of a track according to a second embodiment in a working state.

A second embodiment of the invention is described below with reference to FIG. 3. In contrast to the first embodiment, the mobile maintenance system 1 is designed as a rail vehicle. The mobile maintenance system 1 is transported to the place of use by means of a rail vehicle and transported away from the place of use again. The mobile maintenance system 1 therefore does not have its own traction drive.

Furthermore, the drives $A_V$ and $A_B$ of the displacement device 12 and the handling device 11 are fluid-operated. This means that the drives $A_V$ and $A_B$ can be actuated by means of a pressure fluid. The drives $A_V$ and $A_B$ are designed, for example, as a piston-cylinder unit and/or as a fluid motor. The drives $A_V$ and $A_B$ are actuatable, for example, pneumatically by means of compressed air and/or hydraulically by means of a pressure liquid, for example a hydraulic oil. For this purpose, the device 10 comprises a pressure fluid supply unit 33 with a pressure fluid generator 34 and a pressure fluid reservoir 35. The pressurized air generator 34 is designed as an electrically operable pump. For the supply of electric energy, the mobile maintenance system 1 has a connection 36 which is connected to an external supply line 37. The external supply line 37 is connected, for example, to an electric power supply of the rail vehicle. The pressure fluid reservoir 35 is connected to the actuators $A_V$ and $A_B$ via pressure fluid lines, pressure fluid valves and pressure fluid connections that are not shown in detail. The pressure fluid lines, pressure fluid valves and the pressure fluid connections are designed as to be electrically insulating. With regard to the further structure and the further operating principle, reference is made to the first embodiment.

A third embodiment of the invention is described below with reference to FIG. 4. In contrast to the previous embodiments, a displacement axis $V_S$ of the displacement device 12 is designed as a swivel axis. For this purpose, the displacement device 12 has a carrier 38 and a swivel bridge 39. The carrier 38 is fastened to the chassis 6. The carrier 38 is fork-shaped. The swivel bridge 39 is mounted on both sides on the carrier 38. The displacement axis $V_S$ runs parallel to the y-direction. The drive $A_V$ is designed as to be electric. With regard to the further structure and the further operating principle, reference is made to the preceding embodiments.

The individual features of the different embodiments may be combined in any desired manner.

The invention claimed is:

1. A device for the maintenance of an overhead line system of a track, the device comprising:
   a handling device for handling a tool, said handling device being configured as a multi-axis robot and having at least five movement axes;
   a displacement device for displacing the handling device between a transport position and a working position;
   at least one sensor for controlling and/or monitoring the handling device;
   at least one electrically insulating insulation element configured to prevent an undesired current flow due to an overhead line voltage;
   an enclosure, said displacement device being fastened in a receiving space of said enclosure; and
   in said transport position, said handling device being arranged inside said enclosure, and in said working position, said handling device being arranged outside said enclosure.

2. The device according to claim 1, wherein said displacement device defines at least one displacement axis for displacing said handling device in a vertical direction.

3. The device according to claim 1, wherein said displacement device defines at least one linear axis for linearly displacing the handling device.

4. The device according to claim 1, wherein said displacement device defines at least one swivel axis for swiveling the handling device.

5. The device according to claim 1, wherein at least one of said handling device or said displacement device comprises at least one electric drive.

6. The device according to claim 1, wherein at least one of said handling device or said displacement device comprises at least one fluid-operated drive.

7. The device according to claim 1, wherein said handling device comprises a tool holder in which a tool is accommodated.

8. The device according to claim 1, further comprising a tool magazine for providing tools.

9. The device according to claim 1, further comprising at least one of an energy generator or an energy storage device.

10. The device according to claim 1, further comprising a control unit for at least one of controlling or monitoring said handling device.

11. The device according to claim 1, further comprising at least one protective element configured for protecting said handling device from environmental influences in said transport position.

12. A mobile maintenance system for the maintenance of an overhead line system of a track, the maintenance system comprising:
   a chassis;
   a plurality of wheels rotatably mounted to said chassis; and
   a device according to claim 1 disposed on said chassis.

13. A method for the maintenance of an overhead line system of a track, the method comprising the following steps:
   providing a device according to claim 1;
   transporting the device to a place of use with the handling device being in the transport position;
   transferring the handling device from the transport position to the working position with the displacement device; and
   performing maintenance work with the handling device and a tool.

14. The device according to claim 1, wherein said displacement device is configured as a lifting platform.

15. The device according to claim 1, wherein said enclosure comprises at least one enclosure opening for displacing said handling device between said transport position and said working position.

16. The device according to claim 15, wherein said at least one enclosure opening is formed on an upper side of said enclosure.

17. The device according to claim 1, wherein said at least one insulating element is part of at least one of said tool or said handling device or said displacement device.

18. The device according to claim 1, wherein said at least one sensor comprises a first sensor, which is arranged at said handling device and is configured to detect at least one of an object to be processed or an object to be removed; and a second sensor, which is arranged in said receiving space and is configured to detect said receiving space and a working space of said displacement device and said handling device.

* * * * *